March 7, 1944. J. M. RADABAUGH 2,343,799
WELDING TOOL
Filed Aug. 6, 1942 2 Sheets-Sheet 1
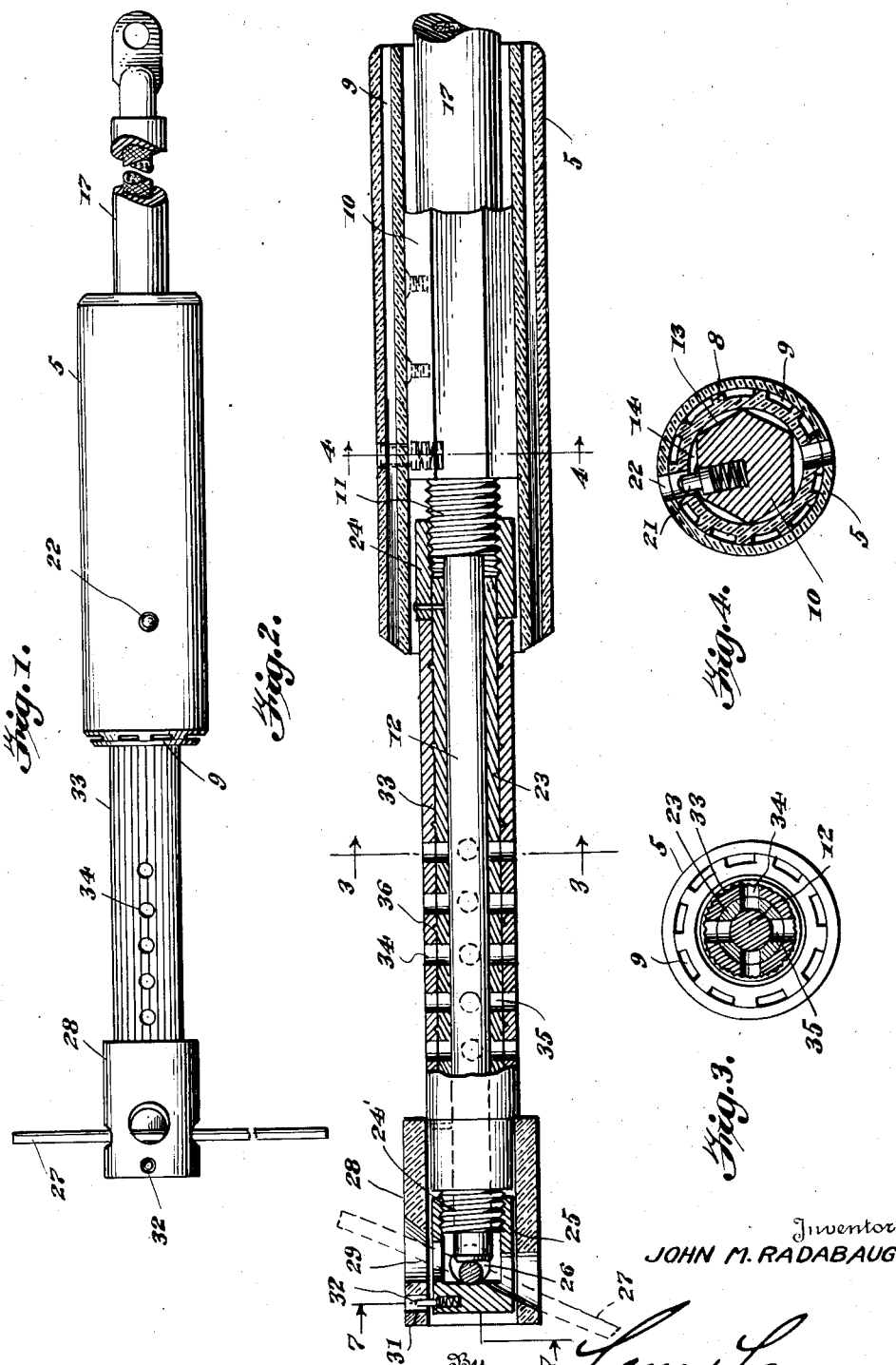
Inventor
JOHN M. RADABAUGH
By Lacey & Lacey,
Attorneys

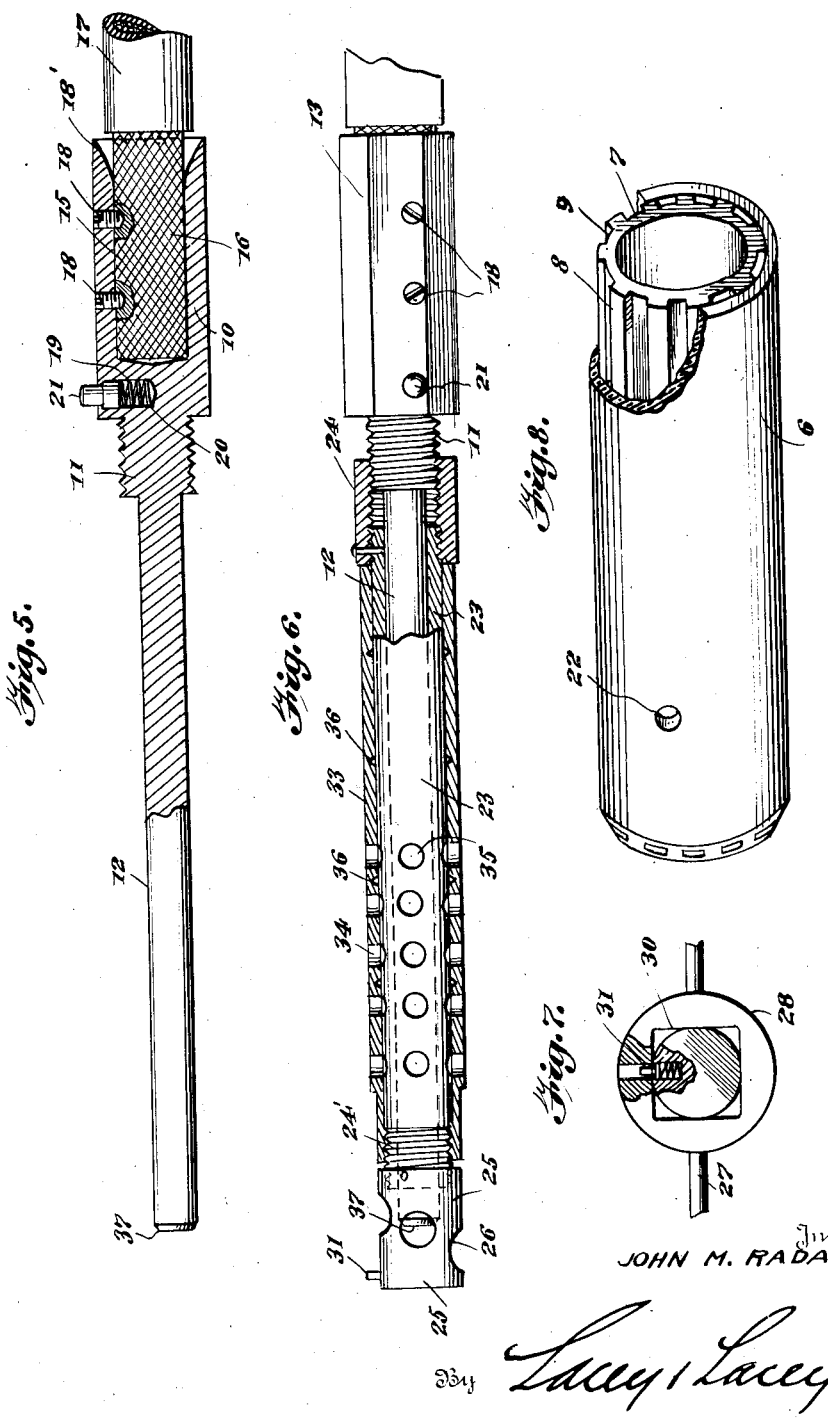

Patented Mar. 7, 1944

2,343,799

UNITED STATES PATENT OFFICE 2,343,799

WELDING TOOL

John M. Radabaugh, Mount Vernon, Ohio

Application August 6, 1942, Serial No. 453,861

7 Claims. (Cl. 219—8)

This invention relates to welding tools and more particularly to a novel form of electrode holder for use in electric arc welding.

The object of the invention is to provide a welding bar holder of simple and inexpensive construction having an insulated handle provided with longitudinally disposed flutes or corrugations to allow free flow of air therethrough, thereby to prevent overheating of the handle, which is an objectionable feature in the present types of welding bar holders now on the market.

A further object of the invention is to provide an electrode holder in which the bar clamping rod or electrode is mounted for rotation in the holder for wiping contact with the welding bar, thereby to assist in removing foreign particles from both the bar and electrode and insure a clean contact between the parts at all times.

A further object is to provide an electrode holder having a tapered cable receiving socket formed with angular exterior walls spaced from the interior of the handle to form air passages and further to provide a perforated sleeve surrounding the electrode to permit the escape of hot air from the enclosing tube of said electrode.

A further object of the invention is to provide a novel form of insulating tip to prevent grounding when the holder is laid down on the work, said tip being so constructed as to permit the escape of heat therefrom.

A still further object of the invention is generally to improve this class of devices so as to increase their utility, durability and efficiency.

In the accompanying drawings:

Figure 1 is a side elevation of a welding bar holder constructed in accordance with the present invention.

Figure 2 is a longitudinal sectional view showing, in dotted lines, how the welding bar can be held at any desired angle with respect to the electrode.

Figure 3 is a transverse sectional view taken on the line 3—3 of Figure 2.

Figure 4 is a similar view taken on the line 4—4 of Figure 2.

Figure 5 is a longitudinal sectional view, partly in elevation, of the electrode and its associated parts, detached.

Figure 6 is a similar view showing the tube and perforated sleeve surrounding the electrode, the insulated tip being removed in order to show the construction of the copper tip or terminal.

Figure 7 is a transverse sectional view taken on the line 7—7 of Figure 2.

Figure 8 is a perspective view of the ventilated handle detached, portions thereof being broken away to show the construction of the flutes or ribs.

The improved welding bar holder forming the subject matter of the present invention comprises a rotatable supporting handle 5, preferably cylindrical in shape, and formed of vulcanized rubber or other suitable insulating material, said handle consisting of an outer sleeve 6 and an inner sleeve 7 provided with longitudinal ribs or corrugations 8 defining intermediate passages 9 to permit the free flow of air through the handle to prevent overheating thereof. The sleeves 6 and 7 may be of integral formation but it is preferred to make said sleeves separately and force one within the other to provide a tight fit between the parts.

Disposed within the handle 5 is a metal bar 10 having a reduced threaded portion 11 terminating in a longitudinally disposed rod constituting an electrode 12. The outer end of the bar 10 is enlarged and provided with a plurality of angular faces 13 which bear against the inner wall of the handle 5 to form intermediate passages 14 so that the air can freely circulate between the bar and the handle for the purpose of assisting in cooling the handle. The enlarged portion of the bar is provided with a socket 15 adapted to receive the terminal 16 of an electric cable, indicated at 17, there being set screws 18 threaded through the walls of the socket 15 and engaging the cable for detachably holding said cable within the socket. The walls of the socket 15 at the mouth thereof are preferably curved or deflected laterally, as indicated at 18', to assist in guiding the terminal of the cable within the socket.

Fitted in an opening 19 in the bar 10, is a coil spring 20 which normally bears against a yieldably supported pin 21, the outer end of which is adapted to fit within a correspondingly shaped opening 22 formed in the handle 5 for the purpose of locking the handle to the bar 10 so as to rotate therewith. Surrounding the electrode 12 is a tube 23 having a threaded collar 24 secured thereto and engaging the threaded portion 11, as best shown in Figure 2 of the drawings.

Threaded on the outer end of the tube 23, at 24', is a hollow tip 25 preferably formed of copper and provided with pairs of transversely alined openings 26 disposed at different angles with respect to the longitudinal plane of the electrode for the purpose of supporting a welding bar, indicated in dotted lines at 27, at any desired angle or inclination. Fitted over the copper tip 25 is an insulating jacket 28 having openings 29 formed therein in registration with the adjacent openings 26, said insulating jacket being open at its outer end and extended longitudinally beyond the adjacent end of the copper tip 25 so as to prevent grounding of the holder when said holder is laid down on the work. The inner walls of the insulating jacket 28 are of angular formation, as indicated at 30, so as to permit the escape of heat incident to a welding operation. The copper tip 25 is provided with a spring pressed pin 31 adapted to seat within an opening 32 formed in the insulating jacket 28 for the purpose of detachably holding the insulating jacket in position on the tool. Surrounding the tube 23 is a longitudinally serrated hard rubber sleeve 33 constituting a stationary handle, and formed in said sleeve are spaced openings 34 which register with corresponding openings 35 in the tube 23 to assist in permitting the escape of heat from the electrode. The tube 23 is formed with a plurality of lateral spurs 36 which engage the insulating sleeve and serve to intimately unite the same. The terminal of the electrode 12 is preferably inclined or beveled, as indicated at 37, so as to permit said terminal to engage the welding bar 27 irrespective of the angle or inclination of said welding bar. It will here be noted that inasmuch as the electrode is adjustable longitudinally and mounted for rotation with the handle, the terminal of said electrode will have a wiping contact with the welding bar 27 so as to assist in removing foreign particles from both the bar and electrode and thus insure a clean contact between the parts at all times.

In operation, the welding bar 27 is extended transversely through the openings in the copper tip and insulating jacket, after which the operator grasps the stationary handle or sleeve 33 with one hand and the rotary handle 5 with the other. By now rotating the handle 5, the electrode will be forced in engagement with the welding bar, thereby to clamp said welding bar in position on the tool, as will be readily understood. By rotating the handle 5 in the reverse direction, the electrode will be disengaged from the welding bar so as to permit the removal thereof when desired.

From the foregoing description it is thought that the construction and operation of the device will be readily understood by those skilled in the art, so that further description thereof is deemed unnecessary. It will, of course, be understood that the device may be made in different sizes and shapes and constructed of any suitable material without departing from the spirit of the invention.

Having thus described the invention, what is claimed is:

1. A welding bar holder comprising a rotary handle including inner and outer tubular members one of which is provided with radial ribs defining intermediate longitudinal passages to permit the flow of air therethrough, a longitudinally adjustable electrode operatively connected with the handle for movement therewith and provided with an enlarged portion fitting within the inner tubular member and formed with intersecting angular exterior walls bearing against said inner tubular member at their points of intersection to form auxiliary air passages, a tube surrounding the electrode and having threaded connection with said electrode, a tip piece mounted on the end of the tube and provided with transversely alined openings for the reception of a welding bar, and an insulating jacket surrounding the tip piece and normally projecting longitudinally beyond the adjacent end of said tip piece to form a guard to prevent grounding of the holder, said electrode being movable into clamping engagement with the welding bar upon rotation of the handle.

2. A welding bar holder comprising a hollow rotary handle including inner and outer tubular members one of which is provided with radiating ribs defining intermediate air passages to permit the flow of air longitudinally through said handle, a longitudinally adjustable electrode operatively connected with the handle for movement therewith and provided with an enlargement having intersecting angular exterior walls engaging the inner wall of the inner tubular member at the points of intersection of said angular walls and defining auxiliary air passages, there being a socket formed in said enlargement adapted to receive a power cable, a tube surrounding the electrode and having threaded engagement therewith, and a tip piece threaded on the tube and provided with transverse openings for the reception of a welding bar, said electrode being movable into clamping engagement with the welding bar upon rotation of the handle.

3. A welding bar holder comprising a hollow rotary handle having an opening therein, a longitudinally adjustable electrode mounted for rotation with the handle, said electrode being provided with an enlargement fitting within the handle and having intersecting angular exterior walls bearing against the inner wall of said handle at the points of intersection of said angular walls to form intermediate air passages, said enlargement being provided with a cable receiving socket having a bell-shaped mouth, a spring pressed pin carried by the enlargement and fitting within the opening in the handle, a tube surrounding the electrode and having threaded engagement therewith, a tip piece secured to the tube and provided with transverse openings for the reception of a welding bar, and an insulating jacket surrounding the tip piece and normally projecting longitudinally beyond the adjacent end of said tip piece to form a guard to prevent grounding of the holder, said electrode being movable into clamping engagement with the welding bar upon rotation of the handle.

4. A welding bar holder comprising a longitudinally adjustable electrode having a threaded portion, a tube surrounding the electrode and provided with threads engaging the threads on the electrode, a welding bar supporting tip secured to the tube, means for connecting the electrode to a power cable, an insulating jacket detachably secured to and surrounding the tip and provided with interior angular walls engaging said tip and defining air passages, the end of the jacket being spaced longitudinally from the adjacent end of the tip to form a guard to prevent grounding of the holder, and a handle connected with the electrode for rotating the electrode into clamping engagement with the welding bar.

5. A welding bar holder comprising a longitudinally adjustable electrode having a threaded portion, a tube surrounding the electrode and provided with threads engaging the threads on the electrode, a welding bar supporting tips secured to the tube, means for connecting the electrode to a power cable, an open-ended insulating jacket surrounding the tip and detachably mounted thereon the outer open end of the jacket normally projecting longitudinally beyond the adjacent end of the tip to form a guard to prevent grounding of the holder, a spring locking pin carried by the tip and engaging the jacket for detachably holding said jacket in position on the tip, and a handle operatively connected with the electrode for rotating said electrode into clamping engagement with a welding bar.

6. A welding bar holder comprising a longitudinally adjustable electrode having one end thereof enlarged and provided with intersecting exterior walls and an interior socket for the reception of a power cable, said electrode being provided with a threaded portion adjacent the enlargement, a perforated tube surrounding the electrode, an interiorly threaded collar fitted to one end of the tube and engaging the threads on the electrode, a tip piece secured to the other end of the tube and provided with transversely alined openings for the reception of a welding bar, an insulating sleeve surrounding the tube between the collar and tip and provided with openings registering with the openings in the tube, an insulating jacket detachably secured to and surrounding the tip piece and having portions thereof spaced from the tip piece to form air passages, the outer end of said jacket being projected longitudinally beyond the adjacent end of the tip to form a guard to prevent grounding of the holder, a locking pin carried by the tip piece and engaging the insulating jacket, a tubular handle secured to the enlarged end of the electrode and having its interior wall bearing against the exterior angular walls of said enlargement at the points of intersection of said angular walls and a detachable connection between the handle and the electrode.

7. A welding bar holder comprising a longitudinally adjustable electrode having one end thereof enlarged and provided with intersecting angular exterior walls and an interior socket and another portion thereof threaded, a rotary tubular handle surrounding the angular portion of the electrode and bearing against the angular walls at the intersection thereof to form intermediate air passages, means for detachably connecting the handle with the electrode to rotate therewith, a tube surrounding the electrode and having a threaded collar engaging the threaded portion on the electrode, said collar being spaced from the interior walls of the handle to form an air passage communicating with the first mentioned air passages, a tip piece secured to the end of the electrode and provided with transversely alined openings for the reception of a welding bar, an insulating jacket surrounding the tip piece and projecting longitudinally beyond the end of the tip piece to form a guard to prevent grounding of the holder, and an insulating sleeve surrounding the electrode between the threaded collar and insulating jacket.

JOHN M. RADABAUGH.